Oct. 25, 1932.  E. E. KLEINSCHMIDT  1,884,744
REPEATING SYSTEM AND APPARATUS
Filed Dec. 15, 1930  5 Sheets-Sheet 1
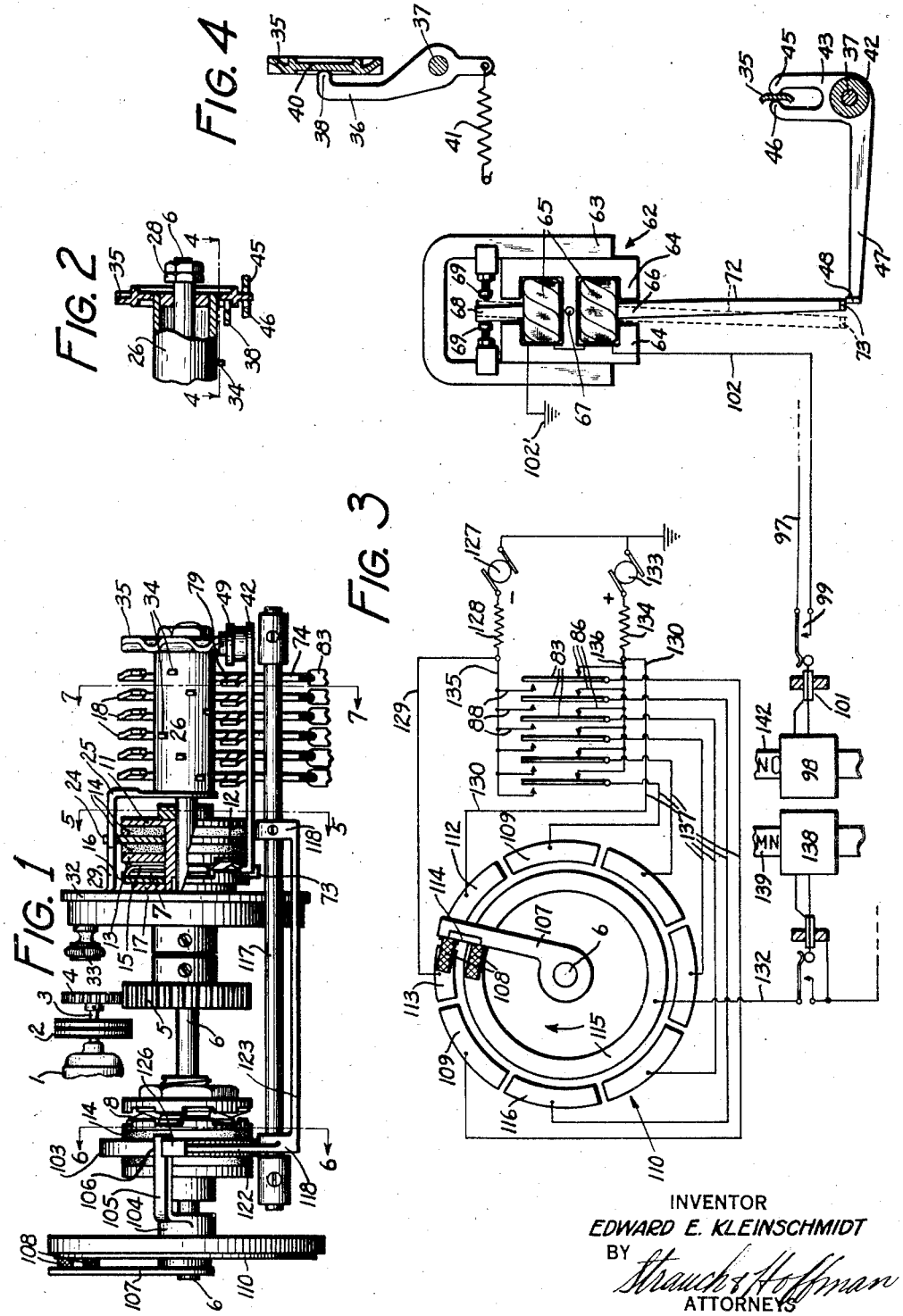
INVENTOR
EDWARD E. KLEINSCHMIDT
BY Strauch & Hoffman
ATTORNEYS

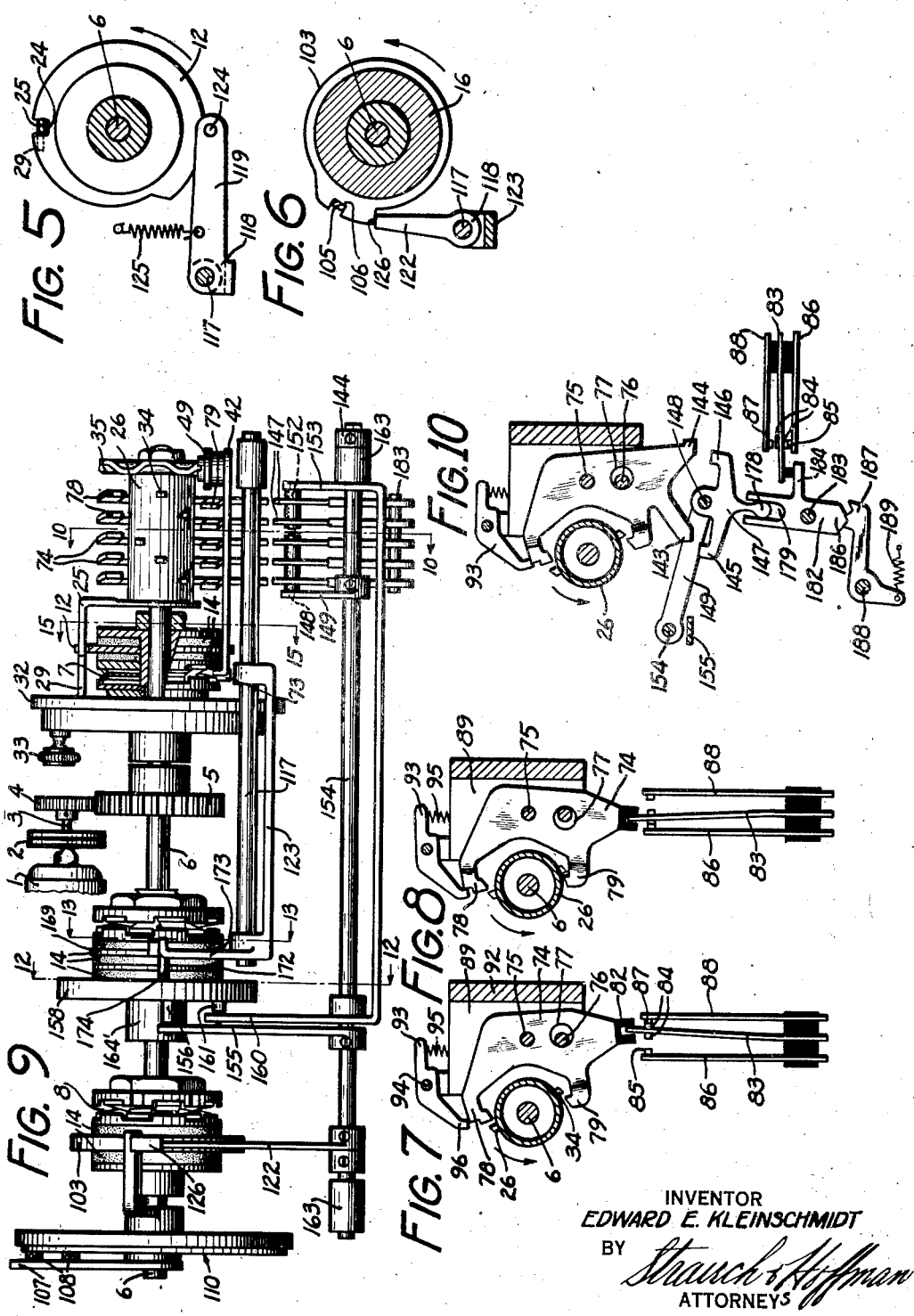

Oct. 25, 1932.    E. E. KLEINSCHMIDT    1,884,744
REPEATING SYSTEM AND APPARATUS
Filed Dec. 15, 1930    5 Sheets-Sheet 3
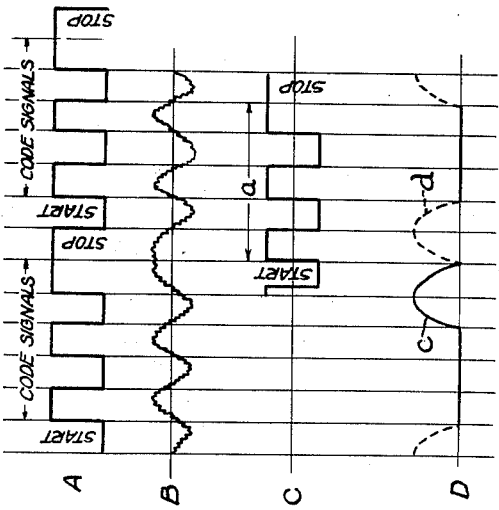
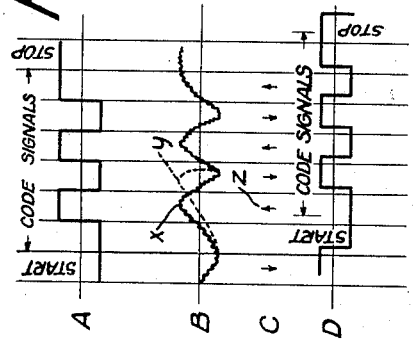
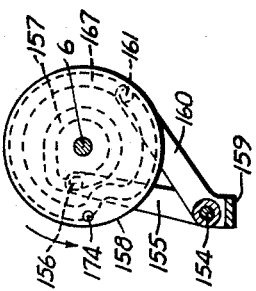
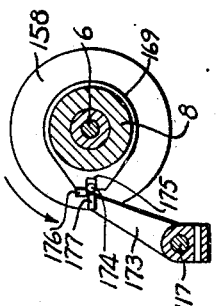
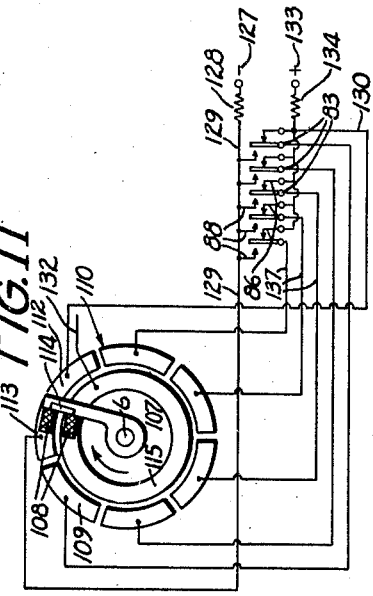
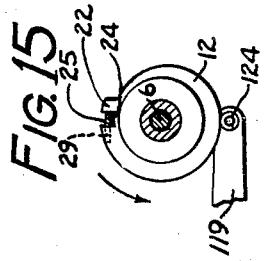
INVENTOR
EDWARD E. KLEINSCHMIDT
BY
ATTORNEYS Oct. 25, 1932.  E. E. KLEINSCHMIDT  1,884,744
REPEATING SYSTEM AND APPARATUS
Filed Dec. 15, 1930  5 Sheets-Sheet 4
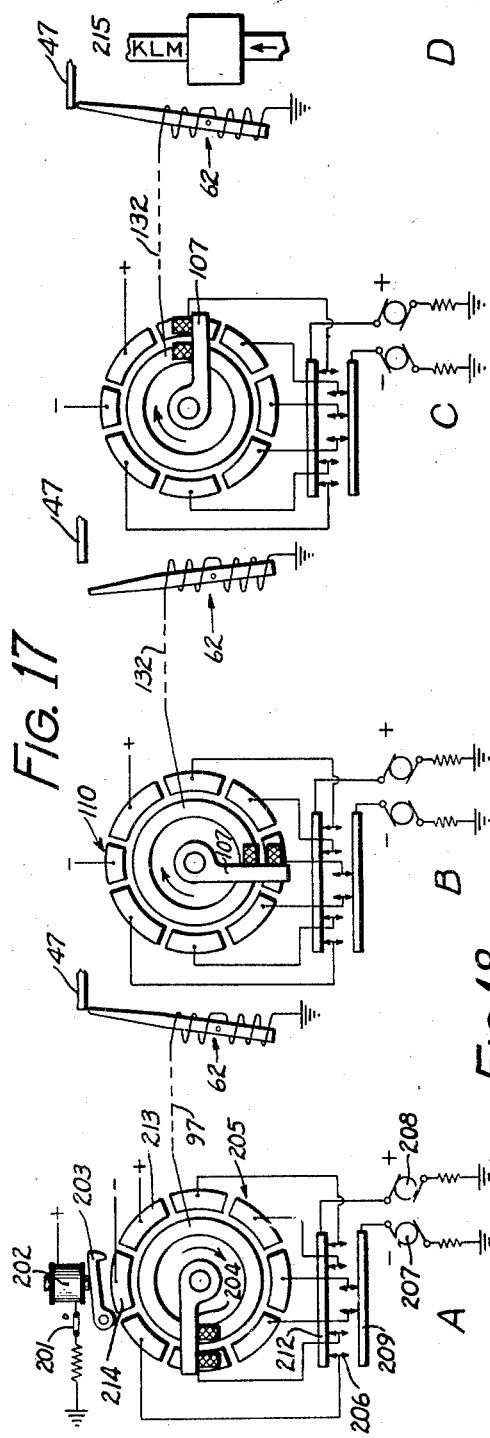
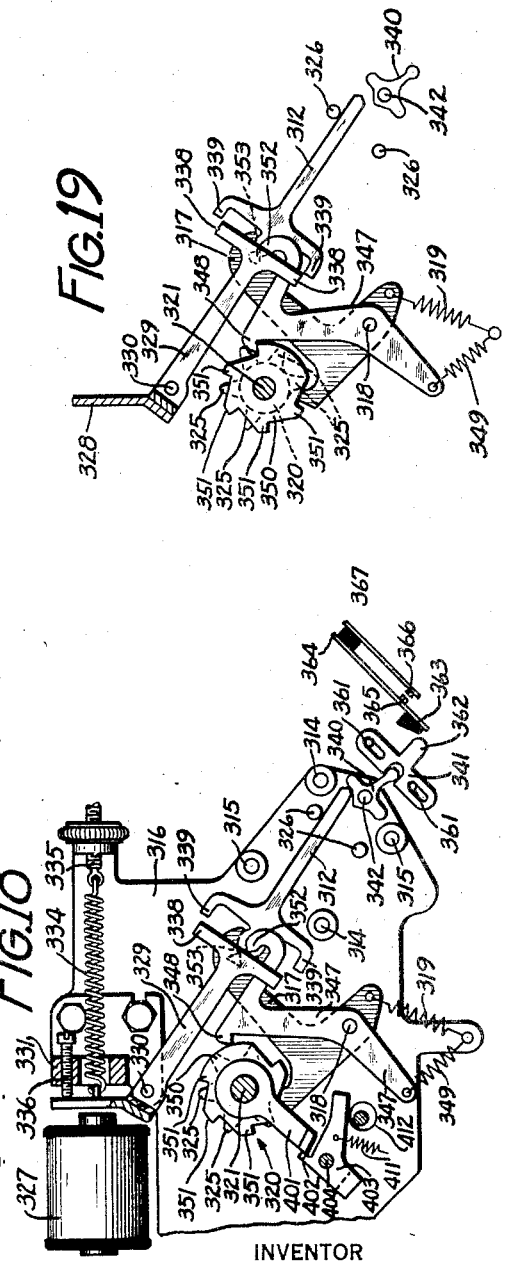
INVENTOR
EDWARD E. KLEINSCHMIDT
BY
Strauch & Hoffman
ATTORNEYS Oct. 25, 1932.                E. E. KLEINSCHMIDT                1,884,744
                         REPEATING SYSTEM AND APPARATUS
                     Filed Dec. 15, 1930        5 Sheets-Sheet 5
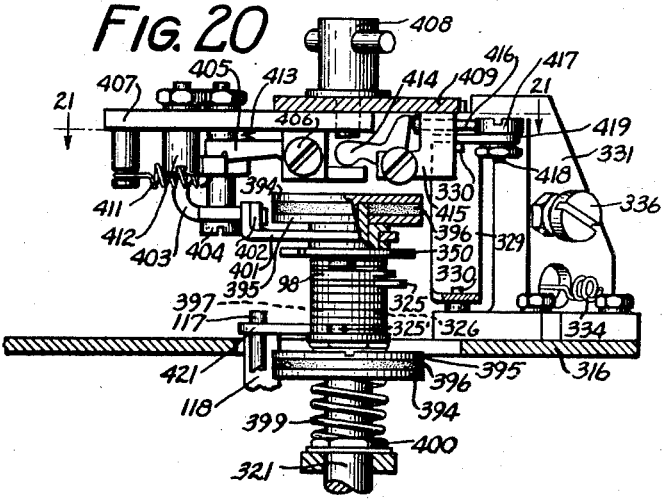
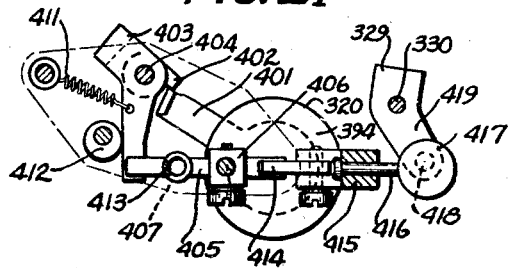
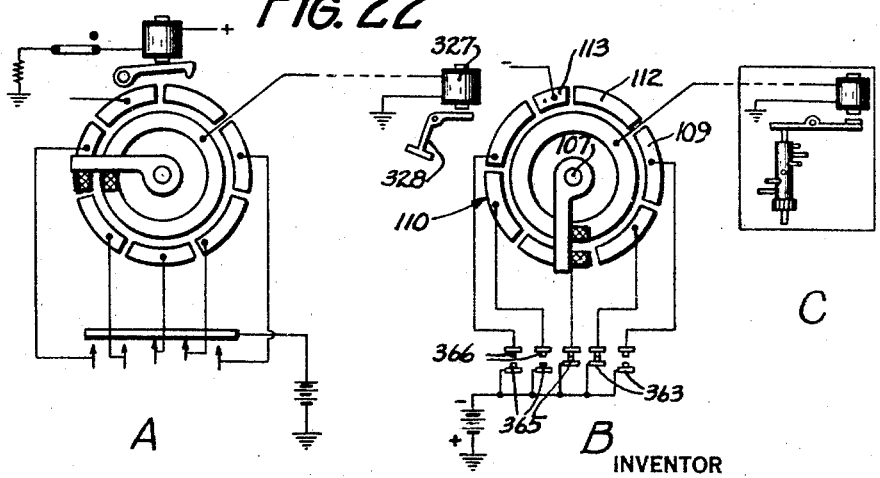
INVENTOR
EDWARD E. KLEINSCHMIDT
BY
ATTORNEYS Patented Oct. 25, 1932

1,884,744

UNITED STATES PATENT OFFICE

EDWARD E. KLEINSCHMIDT, OF CHICAGO, ILLINOIS, ASSIGNOR TO TELETYPE CORPORATION, OF CHICAGO, ILLINOIS, A CORPORATION OF DELAWARE

REPEATING SYSTEM AND APPARATUS

Application filed December 15, 1930. Serial No. 502,537.

This invention has reference to telegraphic systems and apparatus for the automatic reception and retransmission of electric signals. More particularly the invention relates to start-stop repeating systems and apparatus especially useful in printing telegraph systems.

The principal object of the present invention is the provision at a repeating station of efficient repeating devices of the start-stop type organized into a repeating system for connecting two sections of a long telegraph line and for re-forming and re-transmitting the signals received from one section into the succeeding line section.

In most types of repeater organizations for single line telegraph systems, it has been the usual practice to utilize non-polarized or neutral relays or combinations of such relays. It is a well known fact that a polarized electromagnet responds more rapidly to line signals and requires less operating current, and is for these reasons more sensitive and efficient. Accordingly, one object of this invention is to provide an efficient repeater utilizing a polarized electromagnet responsive to the incoming line signals and controlling in turn a mechanical start-stop retransmitting organization as hereinafter described.

While preferably a polarized magnet is utilized to receive the impulses to which the repeater is responsive, there are certain cases where it is not practicable to use a polarized magnet. Another object of this invention therefore is the provision of an efficient and accurate repeater which may use a neutral electromagnet without sacrificing the advantages obtained by use of a polarized magnet.

In certain types of regenerative repeaters, using a rotary distributor, and operated in series in the same circuit and in synchronism, difficulties have been experienced with surges in the synchronization which seriously interfere with or even prevent operation. Another object of this invention therefore is the provision of a repeater in which the speeds thereof may be accurately maintained irrespective of synchronization surges.

More specifically this object is accomplished by the provision of a repeater in which the speed of the rotary parts at each repeating station is adjusted to a standard speed instead of having its speed adjusted under the control of the line impulses.

A further object of this invention is to provide a transmission system in which any number of repeaters may be placed in series in a line with as perfect results at each repeating station as though it were the only repeating station in the circuit.

A further object is to provide a repeater organization in which the speeds of the various rotating elements of the system are so chosen that slight variations in speed of the driving means at the different stations comprising the system is compensated for automatically.

A further object is to provide a repeating station having means to regenerate or restore the original form of the more or less distorted or attenuated received impulses when retransmitting the impulses into the succeeding line section.

A further object is to provide a repeater station arranged to allow a period of time for the setting of operated contact points between the time of receiving a pulse and the time of retransmitting that pulse.

Still another object is to provide at such a repeating station, equipment varying only in slight details from start-stop equipment quite generally employed at terminal stations for sending and receiving, thereby facilitating the manufacture of equipment embodying this invention, and further simplifying and facilitating adjustment and maintenance of this improved repeating system by attendants skilled in the adjustment and maintenance of start-stop equipment and systems employed as terminal equipment.

A further object of this invention is to provide at such a repeating station equipment which shall comprise a smaller proportion of electrical equipment, and a larger proportion of mechanical equipment than in the prior art, and in which the necessity for use of storage relays common in prior repeaters is eliminated, thus reducing to a large extent the service of frequent readjustment of sunflower brushes and cleaning, burnishing, and readjusting of contacts and relay points, there being only a minimum number of mechanically operated contacts in my invention, and no relays, thereby stabilizing the operation of the equipment and contributing to the continuity of its operation, a feature which is of even greater importance at a repeating station than at a terminal station.

Another object of this invention is to provide only contacts which are mechanically operated, and with the excess power so available these contacts can be made self-polishing and self-cleaning in service.

In carrying out this invention in the preferred form, there is provided a polarized electromagnet rather than a relay for receiving the pulses and for indicating their electrical nature; a mechanical distributor for distributing the pulse-indexes to a plurality of mechanical storage units wherein each pulse-index is stored for a period of time; an electrical distributor for collecting the stored pulse-indexes and for retransmitting the pulses as indexed; and a timing device for delaying the starting of the retransmitting distributor to permit the storage device to assume a set position.

Apparatus to function in the manner above described can be variously constructed.

The foregoing and various other objects of this invention will be apparent from the following description and the appended claims when taken in connection with the accompanying drawings wherein:—

Figure 1 is a side elevation of the preferred form of improved repeater mechanism.

Figure 2 is a partial sectional view of the flutter cam of the selector pin barrel with its associated flutter lever.

Figure 3 is a face view of the distributor, a plan view of the receiving polarized electromagnet with its associated flutter lever and flutter cam, as well as the circuit diagram, for the form of repeater shown in Figure 1.

Figure 4 is a sectional view on the line 4—4 of Figure 2.

Figure 5 is a sectional view on the line 5—5 of Figure 1.

Figure 6 is a sectional view on the line 6—6 of Figure 1.

Figure 7 is a sectional view on line 7—7 of Figure 1.

Figure 8 is a view similar to Figure 7 showing the selector lever in alternate position.

Figure 9 is a side elevational view of an alternative form of improved repeater mechanism.

Figure 10 is a sectional view on line 10—10 of Figure 9.

Figure 11 is a face view of the distributor of Figure 9 and a circuit diagram therefor.

Figure 12 is a sectional view on the line 12—12 of Figure 9.

Figure 13 is a sectional view on the line 13—13 of Figure 9.

Figure 14 shows a timing chart for the preferred form of repeater device.

Figure 15 is a sectional view on line 15—15 of Figure 9.

Figure 16 shows a timing chart for the modified form of repeater.

Figure 17 is a circuit diagram comprised of a sending station A, two repeater organizations B and C and a receiving recorder D.

Figure 18 is an enlarged detail plan view with parts shown in horizontal section of a modified form of repeater adapted to operate on single current signals.

Figure 19 is a partial plan view of the repeater shown in Figure 18, certain parts being omitted.

Figure 20 is a side elevational view with certain parts in section of the repeater of Figure 18.

Figure 21 is a sectional view on line 21—21 of Figure 20.

Figure 22 is a circuit diagram showing the repeater of Figures 18 to 21 in connection with a receiver.

The present improved repeating device is an adaptation of a receiving selecting mechanism fundamentally quite similar to the receiving selector described in a co-pending application Serial Number 348,612, filed March 30, 1929 by Sterling Morton et al.

The improved mechanism, Figure 1, is driven by motor 1, speed governed and regulated by governor 2, mounted on the shaft 3. Governor 2 may be of any well known type used for accurate regulation of constant speed devices. Also fixed to shaft 3 is pinion 4 in meshing engagement with gear 5 driving main shaft 6 rotatably mounted in suitable bearings in the framework of the repeater. In operation main shaft 6 is rotated continuously by motor 1.

The repeater of this invention embodies a flutter cam, hereinafter described in detail, which is secured to and operated by a cam barrel, the cam barrel being longitudinally slidable on shaft 6.

Two friction clutches 7 and 8 are mounted on shaft 6, one on each side of driving gear 5. These clutches are of the same construction and one only thereof will be described in detail. Referring to Figure 1 it will be seen that the clutch 7 embodies a sleeve member 11 suitably keyed to shaft 6, said sleeve having a flanged portion thereon. Rotatably mounted on sleeve 11 is a drive disc 12 and a loose plate 13. Positioned between drive plate 12 and plate 13 on one side, and between said drive plate 12 and the flanged portion of sleeve 11, are friction members 14 of suitable material such as felt. Loose plate 13 is engaged by a slit annular spring member 15 which presses against a threaded disc 16 secured on the threaded end of sleeve 11 and held in position by lock nut 17. Obviously the tension of spring member 15 may be adjusted by the threaded disc 16 after loosening lock nut 17.

It will now be clear that the entire friction clutch mechanism may be removed as a unit without altering the adjustments. Furthermore, a simple adjustment for the friction of the clutch is provided.

From the above described construction it will be clear that rotation of shaft 6 is directly imparted to flanged sleeve 11 and that the annular spring member 15 presses loose disc 13 and driving plate 12, against the felt friction members 14 and against flanged sleeve 11. Therefore, driving plate 12 will be rotated by shaft 6 as long as said plate is free to rotate.

The other clutch member 8 is similar to clutch 7 described in detail and operates in substantially the same manner.

Receiving and selecting mechanism

Drive plate 12 by means of slot 24 in its periphery engages a substantially right angle bent portion of stop arm 25 secured to selector cam drum 26, Figures 1 and 5. Cam drum 26 is free for rotation and reciprocation on shaft 6 and accordingly when drive disc 12 is released for rotation it will carry with it selector cam drum 26. The latter is also arranged to slide axially on shaft 6, its axial movement to the right being limited by means of fixed nut 28, Figure 2, no left hand stop being necessary, as will appear hereinafter.

Adapted to engage stop arm 25 in abutting relation when selector cam drum 26 is in its left-hand position, and to clear stop arm 25 when the selector cam drum 26 is in its right-hand position is stop lug 29 which is an integral part of orientation plate 32. The latter is adjustable to various angular positions, and is held fixed to the framework in any of its positions by means of thumb screw 33, the purpose of such adjustment being well known in the art by the term orientation. It is clear that engagement of stop arm 25 with stop lug 29 will stop rotation of drive plate 12 and its associated selector cam drum 26.

Selector cam drum 26 comprises a hollow cylinder with twelve selector cams 34 projecting from its outer surface. Six of these cams are marking cams and six are spacing cams. Each set of six is arranged helically and with a definite circumferential spacing around the periphery of drum 26, said circumferential spacing being determined by the timed position of the received signals with respect to the timed angular positions of drum 26.

At the opposite end of cam drum 26 from stop arm 25 is flutter cam 35 rigidly affixed to cam barrel 26 and hence rotatable with it. Flutter cam 35 consists essentially of a disc having a plurality of radially arranged right and left corrugations equally disposed from the median plane thereof, their location being determined by the position of the selector cams 34.

Referring to Figure 4, it will be noted that flutter cam 35 and consequently its associated cam barrel 26 and stop arm 25 is continuously urged to the right by means of spring lever 36 movable about the pivot 37 fixed to the frame. Rounded end 38 of said spring lever 36 is in contact with a smooth portion 40 on the flutter cam 35 closely adjacent the cam barrel 26 and the opposite end of the lever is secured to tension spring 41. Thus spring 41 continuously tends to rotate arm 36 in a clockwise direction and hence urge cam drum 26 to the right.

Pivoted to the frame at 37 and in operative relation with flutter cam 35 is flutter lever 42 comprising two arms substantially at right angles to each other. The end 43 of lever 42 is bifurcated, having extensions or cam followers 45 and 46, adapted to cooperate with the corrugated cam surface of flutter cam 35. The other arm 47 of flutter lever 42 terminates in an upwardly bent portion 48, for cooperation with a stop arm 72 operated by the selector magnet 62, as hereinafter described in detail.

Referring to Figure 3, the preferred mechanism is controlled by a single selector electromagnet 62 which may be of any well known construction and is supported on the frame in any convenient manner. As shown, selector magnet 62 is of a sensitive polarized type such as is used in high-speed telegraph receiving mechanisms, and comprises a permanent horseshoe magnet 63 surrounding pole pieces 64 and disposed between pole pieces 64 are magnet windings 65. A core armature 66 is pivotally supported on armature bearings 67 in any convenient manner and is arranged to operate in a clockwise or counter-clockwise direction within magnet windings 65. Armature 66 is provided with an extended portion 68 arranged to limit the travel of the armature between adjustable stop screws 69. At the opposite end of armature 66 is an extension or stop arm 72 having an upturned end 73, shown also in Figure 1. As is well known the polarized type of receiving magnet is sensitive to very small operating currents and consequently must be designed with a very small air gap which in turn determines the travel of the armature 66. Extension 72 as measured from pivot 67 to its end portion is long in proportion to the total length of the armature so as to obtain a large travel of end portion 73 with the small movement available at the pole pieces 64.

Associated with each pair of selector cams 34, that is, a pair comprising a spacing selector cam and a marking selector cam, is one of six selector levers 74, Figure 7, pivotally mounted on pin 75 which is on the same horizontal center line as shaft 6. A second pin 76 extends through a hole 77 in each selector lever 74, holes 77 being of a predetermined larger diameter than pin 76 to limit movements of the levers. Pivot pin 75 and stop pin 76 are carried on frame 89.

Each of said selector levers 74 comprises arms 78 and 79 located respectively above and below selector cam drum 26. The ends of arms 78 and 79 are offset with respect to each other, the lower or marking arm 79 being offset toward the left and the upper or spacing arm 78 being offset toward the right of the repeater. This is done so that when a marking cam 34 individual to a particular selector lever lines up with an arm 79, the spacing cam individual thereto will pass to the left of spacing arm 78, and when a spacing cam individual thereto is in line with spacing arm 78, the marking cam individual thereto will pass to the right of marking arm 79. The offset condition of arms 78 and 79 is shown more clearly in Figure 1.

The lower end of each selector lever 74 terminates in an insulated portion 82 operative on contact spring 83. Contact spring 83 carries contacts 84, arranged to move into abutting relation with contact 85 carried on contact spring 86 when the selector lever 74 is in its spacing position, and into abutting relation with contact 87 carried on contact spring 88 when selector lever 74 is in its marking position, said contact springs 83, 86 and 88 being insulated from and rigidly fixed to the frame in any convenient manner.

Selector levers 74 are carried in slots in frame 89 in a selector lever guide 92 located to the rear of selector cam drum 26, which functions to hold the selector levers in proper relation with spacing and marking cams 34 on cam barrel 26, as just described. It will be noted that these selector levers have no normal position but remain set in either operated position until the impulse in a succeeding code permutation is such as to shift them to alternate position. Therefore very little power is necessary to operate them, since there is no resetting of the selector levers to a normal position after every cycle of operation. In addition the number of operations is reduced as they do not operate until a change in the code signal is received.

To prevent accidental movement of selector levers 74 from their selected position, detent 93 individual to each selector lever is movably mounted on pin 94, and is urged into engagement with its selector lever 74 by compression spring 95 which tends to rock its associated detent 93 counter-clockwise. If the selector lever has been set to its marking position or counter-clockwise about pin 75 as seen in Figure 7, the bottom edge of extension 96 of detent 93 will engage the top edge of selector lever 74 holding the latter in its set position, by reason of the spring 95 urging the selector lever 74 counter-clockwise about the pin 75, and edge of hole 77 against side of stop pin 76. Should selector lever 74 be set in its spacing position or clockwise about pin 75, as seen in Figure 8, the right side of extension 96 will engage the left side of selector lever 74 holding the latter in its set position and urged clockwise against stop pin 76, Figure 8.

The operation of the receiving and selecting mechanism of the repeater as thus far described will now be explained.

The repeater shown in Figure 1 and also the repeater of Figure 9 is adaptable to start-stop systems operating on permutation signal polar impulses. Referring to Figure 3, signals of either polarity transmitted from a distant transmitting station are received over line wire 97. A line jack 99 is connected to the incoming line 97 and conductor 102 leading to the selector magnet 62 whereby a monitor printer 98 may be connected into the line by way of its plug 101. If the monitor printer is used, it will be understood that the circuit is completed to conductor 102 through said printer. The monitor printer 98 is used merely to duplicate the record as transmitted through the repeater station as a check thereon and may or may not be used, as desired.

Line signals pass by way of conductors 102 to energize one or the other of windings 65 of polarized magnet 62, the circuit being completed by ground connection 102′. Thus armature extension 72 is operated by incoming signals either positive or negative in nature, said extension being moved to its right position upon reception of a marking impulse and to its left position upon reception of a spacing impulse.

A stop condition normally imposed on the signaling circuit when no signals are being transmitted serves to hold armature 72 in the full line position in Figure 3, and cam barrel 26 to the left of Figure 1 in a position in which arm 25 thereof engages stop 29 to arrest rotation of the cam barrel. Motor 1 is continuously driving shaft 6 and in the normal or stop position of parts friction clutch 7 will slip. It will be recalled that spring pressed lever 36 (Figure 4) is continuously urging the cam barrel 26 to the right of Figure 1, but the engagement of bifurcated ends 45 and 46 of lever 42 will prevent this movement as long as armature extension 72 engages end 48 of the lever 42.

Upon reception of a start condition, armature extension 72 is moved to the left or the dotted line position of Figure 3, whereupon lever 36 (Figure 4) moves the flutter cam 35 and its attached cam barrel 26 to the right of Figure 1, since lever 42 is now free to move clockwise under tension of spring 41 on flutter cam 35 and drum 26. This movement of drum 26 carries arm 25 out of engagement with the stop arm 29. Since arm 25 projects through slot 24 in driven disc 12, the cam barrel and its flutter cam 35 will at once start rotating.

In this embodiment of the invention there are illustrated six selector levers 74, five of these levers being for the usual five element code selection and the sixth lever being a shift lever to determine whether a figure or letter is being transmitted. Obviously the invention is not limited to any number of selecting levers, since if a code combination is being used involving a different number of elements than the five element code, selecting levers 74 will be varied accordingly. For each selector lever 74 there are two cams 34 on cam barrel 26, one cam for a marking condition, and the other for a spacing condition.

Assume now, for example, that a character is being transmitted in the well known five unit code to which a "letters" or "figures" case control condition is added, wherein the selecting conditons are marking, spacing, marking, spacing, and marking, followed by the case control signal. From the above description, it will now be clear that the corrugations on flutter cam 35 must be so arranged as to move the selecting lever 42 at each instant that cams 34 are in position to operate their individual selecting lever 74. That is, when cam barrel 36 has rotated to the point where the first two cams 34 are about to pass under arms 78 and 79 of the left hand selector lever 74, the first corrugation of the flutter lever 35 must raise portion 48 of selector lever 42 to determine whether the incoming signal is of a marking or spacing nature. The timing of the repeater mechanism must therefore be synchronized with the reception of signals so that the first signal will have selectively positioned armature 72 for the first signal by the time end 48 of lever 42 is raised to cause selective setting of the first selector lever 74.

In the example given, since the first signal is of marking nature, armature 72 will have moved to the right just prior to the time the first corrugation on flutter cam 35 moves lever 42 and end 48 clockwise in Figure 3. This movement causes end 48 of lever 42 to engage armature 72 thus preventing further clockwise movement of lever 42. Since lever 42 thus becomes rigid, this corrugation on flutter cam 35 rides up on the rounded ends 45 and 46 of lever 42 and forces the cam barrel 26 to the left of Figure 1. At this point of rotation of cam barrel 26, cams 34 of the left hand selector lever 74 are just ready to pass under the ends 78 and 79 thereof. As a result of this axial movement of cam barrel 26, a marking cam 34 has been positioned in the path of arm 79 of selector lever 74. The first selector lever 74 will thus be moved to the position shown in Figure 7 which is a marking condition, closing contacts 84 and 87.

Continued rotation of the cam barrel carries a reverse corrugation between rounded ends 45 and 46 of lever 42 so that cam barrel 26 may resume its right hand position against stop nut 28 due to the action of spring pressed lever 36 on the flutter cam.

Next, a second rightwardly bent corrugation, see Figure 3, engages portion 45 of lever 42, to attempt to rotate lever 42 clockwise. In the meantime, the sensitive polarized magnet 62 has received its second signal. As in the example given, this was a spacing condition and armature 72 has moved to the left to clear end 48 of lever 42. Therefore, lever 42 is free to rotate clockwise and cam barrel 26 is not forced to the left as in the first illustration. Therefore, for the second selector lever 74 its spacing cam 34 is in position to engage arm 78 to rotate the second selector lever 74 to the position shown in Figure 13 closing contacts 84 and 85, which is a spacing condition.

Continued rotation of cam barrel 26 and flutter cam 35 repeats the above operations, in the example given, the selector levers 74 being positioned to marking, spacing, marking, spacing, and marking conditions in accordance with the received code combination upon the incoming line 97. From the above explanation it will be clear that each selector lever 74 is operated by one or the other of its cams 34 to take a spacing or marking position, said levers being retained in set position by individual detent levers 93 (Figure 7).

The last selector lever 74 is positioned in the same manner, said lever determining whether the code signal is for a letter or figure. Lastly, a stop condition which is of a marking nature is received, positioning armature extension 72 to block the end of lever 42, thus forcing the cam barrel 26 to the left of Figure 1, and positioning arm 25 in the path of stop 29, whereby rotation of the cam barrel is stopped, thus completing one complete revolution thereof and leaving selector levers 74 set in a code combination of marking and spacing conditions.

From the above description it will be clear that the relative position of the cam drum 26 with respect to the received signals is very important, inasmuch as the drum must be at a position such that stop arm 25 engages stop lug 29 before the start signal is received, and must be in a proper position to receive the message code impulses. This, in part, is taken care of by adjusting the speed of rotation. It is, however, also important to start the rotation at a predetermined position of the cam drum 26. To this end orientation plate 32 is adjusted to its best average position as determined by taking an orientation range, a procedure well known in the printing telegraph art. By so adjusting orientation plate 32 stop lug 29 carried thereon is brought to a position whereat selector cam drum 26 must stop at the end of every code combination, and accordingly, drum 26 must always start from the same position. In this manner, the cam drum 26 will be moved to the left or right in accordance with the received marking or spacing impulses.

As will be clear to those skilled in the art, all movements of the cam drum 26 are accomplished entirely by power supplied by motor 1 driving cam drum 26. That is, not only is power for rotating cam drum 26 supplied from this original source, but due to the shaping of flutter cam 35 the rotational power is translated into a linear movement for moving cam drum 26 to the right or left, although this movement is controlled by the line magnet 62. Except, therefore, for releasing the cam drum stop in response to a start impulse as will be described hereinafter, there is a minimum requirement of power from the line magnet 62, the sole requirements of the line current during the signalling period being to move armature 66 which is free from any encumbrance as in the case of a relay. Consequently the receiving line magnet 62 may be of a very delicate structure having a minimum of inertia; hence responsive to very weak signals and able to operate at a very high speed. Inasmuch as the power to operate cam drum 26 is local and not limited in amount, cam drum 26 may rotate and move longitudinally at a very high speed, and need not be so extremely light as is necessary when the power to so move it is limited as is the case when line signals are used.

From the above description it will be apparent that selector drum cam 26 and its associated parts must operate substantially in synchronism with the transmitter, and furthermore, the speed of operation of the repeater must be maintained substantially the same as the transmitter. The synchronism of operation is taken care of by the start-stop principle of operation whereby the repeater automatically starts into operation at the same time that the transmitter initiates operation. It is practically impossible to maintain a transmitter and receiver at exactly the same speeds, and even with a slight difference in speed the instruments would rapidly get out of unison. Accordingly in the present embodiment of this invention the repeater selector drum 26 rotates slightly faster than the distributor on the transmitter, thus allowing the cam drum 26 to complete its rotation slightly before the distributor on the transmitter completes its corresponding rotation. Preferably cam drum 26 is geared to rotate about one-twelfth faster than the transmitter, or in other words, is so geared that it will complete one revolution to thus receive will store one complete code signal of a plurality of marking and spacing conditions, one twelfth faster than the transmitter sends such complete signals. If the transmitter uses a rotary distributor, cam drum 26 will rotate one-twelfth faster than the rotary distributor on the transmitter. However, cam drum 26 is so arranged that the distance between receiving points; that is, the distance between where feeler arm 42 rises, is one-twelfth greater than the distance between corresponding signals being sent from the transmitter. In other words, if the transmitter distributor travels 45 degrees between positions where it sends out subsequent impulses, the selector cam drum 26 must rotate 48¾ degrees from the position where it can receive the first impulse to the position where it receives the second impulse. Since selector cam drum 26 travels one-twelfth faster than the distributor transmitter, it will reach its second position to receive its second impulse at the same time that the transmitting distributor reaches its second position. Accordingly cam drum 26 will reach its initial position of rest slightly before the transmitter. While practically there may be a slight error in the position of the selector drum 26 in its various receiving positions, the mechanism is so arranged as to compensate for such slight inaccuracies, and due to the fact that drum 26 starts each revolution in unison with the transmitter, slight errors are not cumulative.

From the foregoing description it will be obvious that the various selector contacts 84, 85 and 87 will be selectively positioned for spacing or marking conditions in accordance with a code reception of signals during each rotation of cycle of operation of drum 26, said contacts remaining in their set positions until moved by a subsequent code combination. The closing of the various contacts completes the receiving, selecting and storing portion of the cycle of operation.

It will be clear that the mechanical operation of closing the various contacts is performed entirely by mechanical power derived from motor 1. Accordingly these contacts and their associated springs may be substantial in construction and thus able to accurately hold their adjustment. In addition, the contacts are so arranged that there is a wiping action between them, whereby they are made self-cleaning and burnishing.

The effect of closing contacts 84, 85 and 87 will be described in detail hereinafter in connection with the operation of the retransmitting apparatus designed to cooperate with the mechanism so far described.

*Retransmitting apparatus*

Referring to Figure 1, shaft 6, through the friction clutch 8 is arranged to rotate the drive disc 103 of friction clutch 8 when the latter is released for rotation. To the left of and adjacent friction clutch 8 is hub member 104 freely rotatable on shaft 16 and having an axially extended portion 105 arranged to engage slot 106 in drive disc 103, Figure 6. Hub 104 is restrained in axial position by collars (not shown). Thus it is evident that when the drive disc 23 is allowed to rotate, hub 104 will also rotate. Hub 104 is arranged to drive a rotary distributor mechanism 110 as follows. Hub 104 has arranged on its left end a radially extending brush arm 107 carrying brushes 108 insulated from said brush arm and arranged to wipe over six intelligence pulse commutator segments 109, (see Figure 3), a start segment 112 and a stop segment 113. By means of conductor 114 segments 112, 109 and 113 may be successively connected to collector ring 115. Segments 109, 112 and 113 and collector ring 115 are mounted on an insulating disc 116 supported on the frame in any convenient manner. Said segments 109, 112 and 113 and collector ring 115, with their mounting disc 116 and brush arm 107 comprise the retransmitting distributor 110.

Loosely mounted on shaft 117, which is fixed to the frame in any convenient manner, is cam release bail 118 which consists essentialy of rearwardly extending member 119, Figure 5, and upwardly extending member 122, Figure 6, said members being rigidly connected by horizontal connecting member 123. Member 119 carries a cam follower roller 124, Figure 5, in operative relation with drive disc cam 12 and held in engagement therewith by means of tension spring 125. Member 122 is adapted to engage projection 126 on the periphery of the other drive disc 103 and restrains the latter from rotation when held in operative engagement therewith.

The operation of the retransmitting distributor will now be explained.

At a predetermined point in the cycle very shortly after the first code impulse has acted to set the first selector lever 74 and contact pairs 84 and 85 or 84 and 87 have closed and settled, drive disc 12, which is revolving with cam barrel 26 as hereinbefore described, brings a depression in its cam periphery into operative relation with roller 124, whereupon through spring 125 arm 119 is rocked counter-clockwise as viewed in Figure 6, and by means of its rigid connection 123 also rocks arm 122 counter-clockwise, withdrawing arm 122 from engagement with projection 126, thus initiating rotation of drive disc 103 through friction clutch 8. After roller 124 has engaged the depression on disc 12 sufficient time to allow projection 126 to rotate clear of latch 122, the cam periphery of disc 12 operates to reset roller 124 and hence latch 122 to normal position. Consequently, upon the completion of one revolution, projection 126 again engages latch 122, thereby restraining drive disc 103 from further rotation until shortly after the reception of the first impulse of the succeeding character code combination.

Now, when drive disc 103 is released for rotation, it carries with it brush arm 107 by reason of the driving extension 105 engaging slot 106 in drive disc 103. In its stopped position, distributor 110 impresses a negative or stopping impulse on outgoing line 132 from negative source 127, current limiting resistor 128, conductor 129, segment 113, brushes 108, collector ring 115, to wire 132. When the distributor starts, its outer brush 108 leaves stop segment 113 and begins to wipe over start segment 112, which, it will be seen from Figure 3, has impressed upon it a positive polarity from source 133 through current limiting resistor 134, and conductor 130. Thus a start impulse of positive nature is transmitted through segment 112, brushes 109, conductor 114, collector ring 115 to the line wire 132 sending a start impulse of positive or spacing nature to the line wire. In this way, at the beginning of every cycle or revolution, a spacing or start impulse is transmitted at the beginning of every code combination. This new start pulse is the repeated start pulse which originated at the home transmitter and will pass over line 132 to start in turn a receiving selector at the next repeating station, or, in case there is no further repeating station, to start the remote receiving recorder mechanism.

As brush 108 wipes over the six intelligence pulse segments 109 circuits will be completed from negative and positive current sources 127 and 133, through resistors 128 and 134 over conductors 135 and 136 to which contact springs 88 and 86 are respectively multipled, over closed pairs of contacts 84 and 85 and 84 and 87 carried by contact springs 83, 86 and 88, over conductors 137, segments 109, brushes 108, conductor 114, collector ring 115 to line 132. Thus it is seen that depending upon whether a marking or a spacing pulse is received the segments 109 will have impressed upon them pulses of the same nature which are retransmitted over the line wire 132.

After the six intelligence pulses have been transmitted brush 108 wipes over segment 113 and arm 107 thereupon comes to a stop as described hereinbefore, impressing upon line wire 132 negative or marking current to stop the distant selector.

A checking monitor telegraph recorder 138 is inserted in the line 132 by means of a plug and jack similarly to the recorder 98. By this means the outgoing or repeated message on tape 139 may be checked against the incoming or received message as printed on tape 142, and the operation of the repeater may be checked thereby.

Current sources 127 and 133 are shown as independent generators delivering negative and positive polarities with their opposite brushes connected to ground to complete the communicating loop to the distant receiver. In practice these two generators 127 and 133 may preferably be one machine with a center tap to ground and the two outside leads supplying positive and negative current, it being understood that batteries or other sources of current may be used.

The speed relationship of the various rotating parts at the different stations on the system is of primary importance. The motor at each station of the system here proposed is provided with a speed governor, the speed of each motor being adjusted to an appropriate local standard. This may be done by a stroboscopic method with a standard timing fork made for this purpose and well known in the art.

In the present system the repeater stations are serially arranged whereby the start and stop of each repeater is controlled by the next previous repeater in the line. By this arrangement, since each repeater must be started in synchronism with the station from which it is receiving signals, there can be no building up of errors along the line. Due to the start-stop system of operation herein used, each repeater station is started in unison with its immediate transmitting station, and any slight variation in speeds between these two stations will be corrected by the fact that they stop at the end of each code combination and then start in unison again. There is thus no reduction in the operating margin present in prior regenerative repeater systems. With the present system there need be no limit placed on the number of regenerative repeaters which may be placed in series on a signal circuit.

The speed relationship of cam drum 26 and the home transmitter-distributor has been described above. Also of equal importance is the speed relationship of the retransmitting distributor 110 of the repeater station and the transmitting distributor of the home sending station. As has been described, transmitter brush arm 107 of the repeater station is rotated at exactly the same speed as cam drum 26. However, the distributor brush arm of the home transmitter is continuously rotating and brush arm 107 is stopped once in every revolution. It is just as important that a correct phase relationship be maintained between these two brush arms and their related segments.

In what has gone before it was seen that cam drum 26 is so constructed that the angular distance between its consecutive selecting positions is one-twelfth greater than the angular distance between consecutive positions of the home transmitter brush arm, for the reason that the cam drum 26 must rotate one-twelfth faster than the distant transmitter brush arm in order to insure synchronism between the home transmitter and the repeater station.

As just mentioned brush arm 107 rotates at the same speed as the cam drum 26, hence, the angular distance between the consecutive segments of retransmitting distributor 110 must also be one-twelfth greater than the angular distance between the segments of the home transmitting distributor for the same reasons as given for the cam drum 26.

Inasmuch as the factor one-twelfth has been chosen arbitrarily, to satisfy the best average operating condition, this factor may have other values greater or less than one-twelfth, but as is evident, cannot be so excessive that the segments 109 of distributor 110 become so large as to crowd out the stop segment 113 altogether. For in this case it would not be possible to retransmit a stop impulse at all. Or, on the other hand, should the length of stop segment 113 nearly equal the length of segment 109, the stop time of brush arm 107 may be so decreased due to the fact that the speed of rotation of brush arm 107 is almost equal to that of the home transmitter brush arm that said stop time is less than the possible variation of speed which may occur in one revolution. As a result of this reduced stop time the compensation necessary for the proper synchronous operation of this system would be incomplete, and the continued lack of compensation being accumulative would result in larger phase differences and the two transmitters would fall out of step.

It will be clear that the retransmitted signals as set up by the repeating contacts will be of full strength and proper wave form when retransmitted, since they receive a new impetus and strength from new current sources 127 and 133.

From the foregoing description it will be clear that one code impulse can be operating the selector armature 66, and causing the proper contacts to be set up while the preceding impulse is being retransmitted over distributor 110 and line 132.

Figure 14 is a timing chart showing the necessity for a regenerative repeater in a long line and the operation thereof in retransmitting the signals. At A are shown the signals comprising one character code as originated at the home transmitter. B shows the same signals as received at the repeater, distorted and weakened after traversing a long telegraph line. C shows by means of arrows the instants at which the selector magnet armature 66 must operate in order to properly transfer the code impulses to the cam drum 26. It is important that such transfer points correspond in time to portions of the curve B where the magnet current strength and direction are effective so as to operate the armature. If a regenerative repeater were not used and assuming that the received pulses as shown at B be so displaced from their original position that the most effective portion of a pulse, say "x" is as shown by the dotted line "y" this pulse would be lost altogether at a receiving station, since the value of current at time instant "z" being approximately zero would be ineffective to operate the armature 66. However, by the use of one or more regenerative repeaters as herein disclosed, the signals cannot become so distorted as to be inoperative at the receiving station. By this invention a very sensitive polarized magnet may be used whereby even very weak signals will operate the repeater. D shows the retransmitted signals as sent out from the repeater, restored to their full wave form and full strength.

Alternate form of repeater

In Figure 9 is shown an alternative form of repeater mechanism using feeler fingers and transfer levers for setting the contacts.

Certain parts and features of this embodiment of the invention are exactly the same as those of the form shown in Figure 1, while others are only similar in nature. Therefore, the same reference characters will refer to the same or similar parts common to both forms.

While the first form of this invention is a repeater for a start-stop code embodying five character selecting units, a case control unit and a start and a stop condition for each code combination transmitted, the present form shows a repeater for a five unit start-stop code of the usual type utilizing a total of seven impulses per code permutation. Actually the number of impulses per code signal makes no difference in the working of the repeater which can be adapted to be used with proper changes in design, on a system using any number of impulses per code permutation.

Referring to Figure 10, it will be noted that each of the five selector levers 74 used on the repeater of Figure 9 instead of having a contact operating extension is provided with a pair of downwardly diverging arms 143 and 144 adapted to operatively engage projections 145 and 146 respectively of transfer T-lever 147 associated with each selector lever 74. Each transfer lever 147 is in alignment with the selector lever 74 above it, and is individual thereto. Three of these transfer levers 147 are pivotally mounted on pin 148 carried by transfer bail arm 149, and the remaining two transfer levers 147 are pivotally mounted on pin 152 carried by a second transfer bail arm 153, Figure 9.

Transfer bail arm 149 is keyed to and operative with transfer bail shaft 154. Adjacent its other end, shaft 154 has fixedly secured thereto an operating arm 155 carrying a roller 156 engaged in a cam channel 157 (Figure 12) of driven disc 158, whereby shaft 154 may be oscillated to move the first three transfer levers 147 into engagement with their individual selector levers 74. Bail arm 153 carrying the last two transfer levers 74 is one arm of a U-shaped lever 159 loosely journalled on shaft 154, the other arm 160 thereof carrying a roller 161 engaged in cam track 162 of driven disc 158, whereby the last two transfer levers may be engaged with their selector levers 74, the operation of levers 155 and 160 by their cam tracks being described hereinafter in detail. U-shaped bail 159 is retained axially in position on shaft 154 by journals 163 which support shaft 154. A thrust collar 144 prevents shaft 154 from moving axially.

Main or operating cam 158 is freely mounted on main shaft 6 for rotation with respect thereto and is retained in position by a collar 164' affixed to shaft 6. Cam 158 is driven by friction clutch 168 positioned on main shaft 6 and to the right of said operating cam 158, clutch 168 being substantially identical with clutches 7 and 8 hereinbefore described and comprising felt friction discs for driving disc 169, with appropriate adjusting means and disc 172 which serves to separate drive disc 169 from cam 158 by a sufficient distance to provide clearance for latch arm 173 which will be described hereinafter.

Main operating cam 158 is arranged to operatively engage drive disc 169 by means of pin 174 carried by said cam engaging a slot 175 in drive disc 169, as seen in Figure 13. Accordingly, rotation of drive disc 169 will carry with it operating cam 158. Also, on the periphery of drive disc 169 is a projection 176 adapted to engage projection 177 on the end of upwardly extending latch arm 173 of cam release bail 118, Figure 13, which is mounted on shaft 117.

Rigidly fastened to transfer bail shaft 154 and arranged for rotation therewith is distributor stop latch 122 adapted to engage projection 126 on drive disc 103 similar to parts shown in Figures 1 and 6. Drive disc 103 and its clutch mechanism is similar to clutch mechanism 8 described hereinbefore in connection with the first disclosed form of this invention and drives a similar distributor 110, (see Figure 6).

Disposed to the left of selector cam drum 26 is a friction clutch 7 identical in construction with the clutch described in connection with the preferred embodiment, comprising a drive disc cam 12, felt friction discs 14 and the associated tension adjusting means. Adapted to operatively follow the cam surface of drive disc cam 12 is follower roller 124 (see Figure 15) carried by cam release bail arm 119, said arm 119 being an integral part of the cam release bail 118, which carries at its left end the cam release latch 173, described above. Cam release bail 118 is similar to release bail of Figure 1 and is arranged to rock freely on the fixed shaft 117 supported in the frame in any convenient manner.

Referring again to transfer T-levers 147, Figure 10, it will be seen that the lower end of each T-lever 147 terminates in a rounded head 178 which slidably engages slot 179 in one leg of a substantially T-shaped rocker lever 182 pivotally mounted on pin 183, rigidly fixed in the frame of the repeater, there being one such rocker lever individual to each T-lever 147. Each rocker lever 182 has a leg 184 arranged to engage operatively its contact spring 83 insulated from said rocker lever 182 and carrying contacts 84. Arranged in abutting relation with contacts 84 are contacts 85 and 87 respectively carried on contact springs 86 and 88. This contact assembly is similar to that disclosed in connection with the first described embodiment of this invention.

Lower end 186 of each rocker lever 182 terminates in a V-shaped portion adapted to engage corresponding V-shaped notches in detent lever 187 mounted on fixed pin 188 and held in yielding operative engagement with rocker lever 182 by a spring 189, there being one such detent lever 187 and its associated spring 189 individual to each rocker lever 182.

From an inspection of Figures 9 and 10 it will be clear that the cam drum 26, flutter cam 35, and flutter lever 42 of this modification are the same as similar parts shown in Figures 1 to 8.

The operation of the embodiment shown in Figures 9 to 15 will now be described.

Referring to Figure 11 it will be seen that contacts 83, 86 and 88 of this form of the invention are connected to a distributor 110 and to positive and negative sources of potential, the circuit arrangement being the same as that shown in Figure 3.

The parts as shown in Figures 9, 12 and 15 are in their normal position of rest. Upon the reception of a start impulse from the transmitting station or from a prior repeating station connected in the line, armature extension 72, which is operated by a sensitive polarized magnet similar to that shown in Figure 3, is withdrawn from the path of feeler lever 42. The operation of the cam drum 26, its flutter cam 35, and flutter lever 42 are the same as that previously described. That is, the flutter cam moves flutter lever 42 clockwise as viewed in Figure 3 to determine whether the signal is of a marking or spacing nature. The first three selector levers 74 are thus positioned by their spacing or marking cams 34 on the cam drum, the levers being retained in set position by the detents 93 individual thereto. As seen from Figure 15, cam release bail 118 which carries arm 119 and roller 124 is not released until the cam barrel has made slightly more than one-half revolution.

After the first three feeler levers 74 have been thus selectively positioned, roller 124 enters the low portion on cam disc 12, thus allowing cam release bail 118 to be rocked counter-clockwise by its spring. Thereupon, projection 177 of cam release bail arm 173 (Figure 13) is withdrawn from engagement with projection 176 and cam drive disc 169 is released. Friction clutch 168 thereupon drives disc 169 and pin 174 drives disc 158. Shortly after the beginning of rotation of the main operating cam 158, roller 156 of transfer bail operating arm 155 rides up on a projection in its track 159 to thus rock arm 155 counter-clockwise as seen in Figure 12. This oscillation of arm 155 causes movement of shaft 154 and latch arm 122 secured thereto is withdrawn from engagement with distributor driving plate 103.

Rotation of distributor 110 is thus initiated and brush 108 leaves stop segment 113 and engages start segment 112. A positive or spacing impulse is thus sent over line 132 from positive source 133.

Simultaneous with the release of the distributor 110, transfer bail arm 149 which is also rigidly secured to shaft 154, is moved counter-clockwise as seen in Figure 10, thus carrying its three transfer levers 147 into engagement with the previously set selector levers 74 individual thereto. For those selector levers 74 that have been set in counter-clockwise or marking position (one such lever being shown in this position in Figure 10) projection 146 of T lever 147 engages projection 144 of its selector lever. This T lever 147 is rocked clockwise about its pivot pin 148, in turn rocking its lever 182 counter-clockwise about pivot 183 to cause engagement of contact 84 and 87. Each of the first three transfer levers 147 thus moved upwardly are set in spacing or marking position in accordance with the previously selected position of their individual selector levers 74.

Setting of the three rocker levers 182 as above described, will impress marking or spacing conditions on the first three intelligence segments 109 of distributor 110. Therefore by the time distributor arm 107 carries upper brush 108 into engagement with the first three intelligence segments 109, they will have been prepared by operation of the selector levers and transfer levers as above described. Therefore, three marking or spacing condition signals will be selectively sent over line 132 as the distributor 110 rotates.

It will be understood that selector levers 104 are maintained in set position by their individual detent levers 93 as previously described in connection with the first embodiment of this invention. Also the rocker levers 182 are maintained in set position by their individual detent levers 187.

Immediately after the first three distributor segments 109 have been conditioned as thus described, roller 156 engages a low portion of its cam track 157 allowing lever 155 to rotate clockwise as viewed in Figure 12, thus repositioning stop arm 122 of the distributor 110 for engagement when the distributor completes one revolution, and also moving arm 149 clockwise, Figure 10, thereby withdrawing the first three T levers 147 from engagement with selector levers 74. Thus the selector levers 74 are free to receive and set up the first, second and third impulses of a succeeding code permutation of signals.

In the meantime, flutter cam 35 will have operated to move flutter lever 42 to set the last two selector levers 74 in accordance with the received permutation code signal. Next, roller 161 of arm 160 engages a low portion of its cam track 162, thus rocking arm 160 counter-clockwise about shaft 154, and causing transfer bail arm 153 to carry the fourth and fifth T levers 147, into engagement with their selector levers 74. These T levers 147 are selectively positioned in the same manner as previously described, thus impressing a marking or spacing condition on the last two intelligence segments 109 of distributor 110. Roller 161 then engages a high portion of its cam to return the last two T levers 147 to their original position to free their selector levers 74 for a subsequent code permutation of signals.

The apparatus is so constructed that only one projection 145 or 146 of T-lever 147 can engage either one projection 143 or 144 of its selector lever 74 at a time, projection 145 passing freely by projection 143 when 146 and 144 abut, and projection 146 passing freely by projection 144 when 145 and 143 abut.

Directly after the transmission of the fifth code impulse, brush arm 107 causes a marking or stop impulse to be sent to line 132.

It will be clear that immediately after the reception of the start impulse and the first three impulses of a code combination, the apparatus is started into operation for the handling of that received code combination, and while the first three impulses are being retransmitted, the fourth, fifth and stop impulses are being indexed and are retransmitted while the start, first, second and third impulses of the succeeding code are being indexed. An overlap is thus provided whereby the operation may be of high speed and continuous.

As in the prior embodiment, it will be noted that all mechanical work involved in driving the cam drum, setting the selector levers, operating and setting the T levers or transfer levers, closing the contacts, and driving the distributor, is done by the motor 1. Therefore the selecting magnet may be light in weight and sensitive to small current impulses. Furthermore, it will be noted that the signals are stored to provide an overlap without the use of storage relays, thus avoiding the heavy currents necessary to operate relays and also avoiding the necessity for adjustments, cleaning and burnishing of relay contacts.

Referring to the timing chart of Figure 16, A represents a curve similar to curve A of Figure 14, showing two character code combinations of impulses as sent out from the home station, "a" showing the five signalling impulses preceded by a start pulse of spacing nature and followed by a stop pulse of marking nature. B shows a curve similar to curve B of Figure 14 showing the distorted signals as received at the repeater. C shows the signals "a" of curve A retransmitted as of full wave form and full strength by a. D shows the timing of the main cam 158, wherein "c" represents the transfer of the first, second and third impulses from the selector levers 74 to the contacts 84, 85 and 87, and "d" represents the transfer of the fourth and fifth impulses.

From this chart it will be seen from D that cam 158 is arranged to operate the T levers 147 after the selector levers 74 have been set. It will also be clear that an overlap is provided whereby the signals are stored, allowing high speed continuous operation.

Complete system

In Figure 17 is depicted a telegraph system comprising the original or home transmitter A, connected by means of line wire 97 with repeater station B, in turn connected by means of line wire 132 with a second repeater station C, the latter being connected to the distant recorder D by means of a similar line wire 132. Repeater station C is constructed exactly the same as repeater station B, and is shown to illustrate the fact that one or more repeater organizations embodying this invention may be used on one signalling line, as many repeaters being used as are necessary to obtain clear strong signals at the distant receiver, the number of repeaters used being dependent on the characteristics of the system, and the distance between the home sender and the distant receiver.

Sender A may be of any well known type for transmitting signals of a polar nature over line wire 97. As shown, this transmitter is started into operation by closing switch 201 which energizes start magnet 202 to attract latch 203 which allows brush arm 204, frictionally driven from a prime mover (not shown), to start. Brush arm 204 sweeping over the segments and collector ring of distributor 205, causes impulses to be sent to the line 97 as indexed by the transmitting contacts 206. Current sources 207 and 208, supplying marking or negative and spacing or positive polarities respectively energize bus bars 209 and 212 to complete the circuits for contact fingers 206. Start segment 213 and stop segment 214 are connected to positive and negative current sources to send out start and stop pulses at the beginning and end respectively, of each character code.

Repeater stations B and C may be of either type disclosed hereinbefore and shown in Figures 1, 3 and 9.

In the complete system as shown in Fig. 17, the first repeater station B will be operated slightly faster than home transmitter A, and this repeater will have the length of its segments varied, for the reasons hereinbefore explained in detail. However repeater C and all other subsequent repeaters will be run at substantially the same speed as repeater B. That is, all repeaters will operate slightly faster than the home transmitter A.

It will be observed that brush arm 204 of transmitting distributor A is in a position to send out the fifth impulse of a code while brush arm 107 of repeater B is retransmitting the third impulse. Thus repeater B lags approximately two segments behind brush arm 204, and the brush arm 107 of repeater C is lagging two segments behind brush arm 107 of repeater B. This lag is due to the time necessary to receive and index a pulse at the repeater, and similarly for repeater C with respect to repeater B.

D indicates a receiving recorder of any well known type operated by polar signals, for example, a typewheel tape printer 215 of the general form disclosed in a copending application Serial Number 348,612, filed March 30, 1929, by Sterling Morton, et al.

In all three stations B, C and D, a polarized receiving selector magnet 62 such as has been described is shown. The arm 47 only of flutter lever 42 is shown in this figure.

Repeater using neutral magnet

Hereinbefore there have been described two types of repeater organizations for use on start-stop telegraph systems using polar or positive and negative current signalling impulses. It is equally important that regenerative repeating devices be available for use on systems operated on single current code impulses or those of current and no-current intervals, thus using a neutral magnet.

This modification of the invention embodies a repeater designed for single current systems, and which utilizes a simple, well tried selecting mechanism substantially similar to that disclosed in United States Letters Patent No. 1,745,633 granted February 4, 1930 to S. Morton et al., and further improved as disclosed in co-pending application Serial Number 122,808, filed July 16, 1926 by Howard L. Krum.

The selector mechanism shown in Figures 18 to 22 inclusive may be readily adapted to the frame of the repeaters shown in Figure 1 or Figure 8 and may replace the polar signal selector there shown. In this form of the invention, distributor 110 is similar in construction and operation to that previously described in detail in connection with Figure 1 and Figure 8.

The selector mechanism embodies a set of selectors in the form of thin, flat fingers 312, Figures 18 and 19, arranged one above the other between suitable guide plates 313. The plates are mounted on studs 314 spaced by washers 315, the studs being fixed to plate 316 of the repeater frame. Fingers 312 terminate in circular ends which engage corresponding seats in a series of five thin, flat bell cranks 317 disposed between the guide plates and pivoted on studs 318, thus supporting the selector fingers for longitudinal movement. Springs 319 normally hold the bell cranks and selector fingers counter-clockwise about pivots 318 to the position shown in Figure 19, with the pointed rear ends of the bell cranks adjacent cam drum 320 on shaft 321. Shaft 321 is continuously driven when the repeater is in operation, being connected to a speed-controlled motor, not shown, similar to the motor drive shown in Figures 1 and 8.

Cam assembly 320 has on its periphery a series of helically arranged, definitely spaced selector cams 325, five in number, one for each selector finger, and a sixth bail trip cam 325'. In addition to longitudinal movement by bell cranks 317, selector fingers 312 have a swinging movement between a pair of stops 326 fixed to plate 316. Setting of the selector fingers 312 either in their right or left hand position is controlled by selector magnet 327 suitably mounted in the frame of the repeater. Armature 328 of said magnet is fixed to a T-shaped lever 329, pivoted at 330 to bracket 331. Spring 334 secured to the armature and to adjustable member 335 tends to move the same into engagement with an adjustable stop 336. Normally magnet 327 is energized and holds the armature upwardly. The T end of armature lever 329 is provided with a pair of spaced downwardly extending arms 338 and these arms or abutments cooperate with laterally projecting arms 339 on the rear ends of selecting fingers 312 to position the latter either in their right or left hand position.

Selector fingers 312 act through a series of T-shaped levers 340 to position slidable contact-controlling members 341 described hereinafter in detail. T-levers 340 are pivotally mounted on studs 342. Springs 319 normally hold selecting fingers 312 in their forward position in engagement with T-levers 340 and slidable members 341 are thereby each held in one or the other of two positions according as the corresponding selector finger is in its right or left hand position.

Abutments 338 on the end of armature lever 329 are disposed to the rear of the rearwardly turned ends of arms 339 of the selecting levers but are spaced somewhat closer together than the ends of these arms, so that as the armature lever vibrates in response to received electrical impulses, the parts 338 alternately move into and out of alignment with the ends of arms 339 to cooperate therewith as the fingers are reciprocated by rotary cam member 320, thus setting the selector fingers in their right or left position. Thus if a selector finger is in its right hand position shown in Figure 18 and magnet 327 is energized when the finger is retracted by cam member 320, its right hand arm 339 will engage the right hand abutment 338 of the armature lever and the selector finger will thereby be shifted to its left hand position as shown in dotted lines in Figure 21. The selector finger will remain in its left-hand position until the selector magnet is de-energized when next the finger is retracted, at which time the left hand abutment and arm will cooperate to swing the finger to its right hand position. When the setting of any selector finger is thus changed it will, during the final forward movement thereof, change the position of its corresponding contact bar 341 by tilting the intermediate T-lever 340.

It will be understood that selector fingers 312 and contact operating bar 341 correspond in number, five in the present case, to the number of selecting intervals or units of the code combination being used. As each signal is received, magnet 327 responds to one of two different electrical conditions to selectively position armature lever 329 as the selector fingers are successively retracted by the helical series of cams 325 on drum 320 and brought into cooperate relation with the lugs or abutments 338 of the armature lever during the selective intervals of the signals to thereby set the fingers in different combinations.

To provide a wide margin of operation, setting of the primary selector fingers 312 should be determined at definite points of very brief intervals uniformly spaced throughout the selecting cycle, so that said points may register with the mid-portions of the intervals of the received signals or code combinations. It is difficult, however, to construct and operate the parts of a mechanical selector as to effect such exact operation, particularly where, as is highly desirable in order to permit rapid operation, the parts are light in weight and movement of the armature lever is very limited. To provide for a wide margin, this invention provides means for intermittently locking armature lever 329 in either of its selecting positions at definitely spaced points in the cycle of operation, said points being slightly in advance of the portions of the cycle during which the setting of selector fingers 312 is effected.

The locking device above referred to comprises an arm 347 pivoted on the frame and provided with a nose or shoulder 348, spring 349 connected to the arm holding shoulder 348 in engagement with the periphery of cam 350 which forms part of and rotates with cam drum 320. Cam 350 is provided with a series of shoulders 351, five in number, which successively vibrate lever 347 during each operating cycle. The end of arm 347 is also provided with a beveled locking knife edge 352, which cooperates with a similar edge 353 on the under side of armature lever 329 adjacent its outer end. When the nose 348 of locking lever 347 is on a high portion of cam 350, knife edge 352 is positioned out of the path of movement of cooperating knife edge 353 on the armature lever, but when the nose passes to a low portion of its cam, knife edge 352 will engage edge 353 and lock armature lever 329 in the position it has assumed. This locking of the armature lever occurs at definite points in each revolution or setting cycle of cam 320, the points being so arranged that the armature lever 329 is locked just before engagement of arms 339 with abutments 338. Furthermore, teeth 351 are so arranged that the armature lever is held against vibration while arms 339 and abutments 338 are in engagement, and in this way the armature lever is held against movement during any change of the setting of the selector fingers.

Referring now to Figure 18, it will be seen that T-levers 340 are connected to the contact controlling slides 341 which are mounted on studs 361, their longitudinal movement being limited by the elongated slots cooperating with said studs. One such contact controlling member 341 is provided for each T-lever 340, and each member is provided with a downwardly projecting portion 362 each having a curved lower surface for camming engagement with an insulating block 363 mounted on contact spring 364. Spring 364 carries a contact 365 for cooperative engagement with a similar contact 366 mounted on contact spring 367. When a contact controlling slide 341 is in the right hand position the stud 362 thereof rides up on the insulating block 363 causing engagement of contacts 365 and 366. When the slide is in its left hand position the upper spring member 364 opens the contacts. Thus the selectively controlled position of the contact fingers 312 controls the contacts 365 and 366.

Rotary cam drum 320 is driven from shaft 321 by a friction clutch, comprising pairs of discs 394 and 395 having washers 396 of frictional material such as felt between them. Discs 395 are keyed to opposite ends of a sleeve member 397 loosely mounted on shaft 321, the several cams 325 and lock operating cam 350 being mounted on said sleeve. One disc 394 has a threaded stem which is screwed into the upper end of shaft 321 as seen in Figure 20. The other disc 394 is keyed to the shaft to rotate therewith but is capable of longitudinal movement thereon. A spring 399 extending between this slidable disc 394 and an adjustable nut 400 on the shaft presses the discs of the friction clutch into engagement with the washers 396 thereof. It will be clear that the cam drum 320 may slip with respect to shaft 321 when held against rotation therewith.

In order to stop rotation of cam drum 320 or to allow the same to be rotated by the above described friction clutch upon the reception of a start signal, the following mechanism is provided. An arm 401 (Figures 18 and 20) is secured to the upper end of sleeve 397 of cam drum 320, and is provided with an upturned end which normally engages a lug 402 on the lower arm of a U-shaped stop dog 403. Dog 403 is mounted upon a pivot 404 and its upper arm is adapted to be engaged by latch 405, (Figures 20 and 21). Latch 405 is pivoted to a hanger 406, the hanger 406 and stud 404 being fixed to an orientation adjusting plate 407.

Orientation plate 407 functions and is adjusted similarly to orientation plate 32 previously described in connection with Figures 1 and 8. The orientation plate is adjustably secured in position about pivot stud 408 secured to plate 409 which is secured to the frame of the repeater. Spring 411 secured to stop dog 403 tends to swing the latter clockwise as viewed in Figure 21, moving its arm into engagement with an adjustable eccentric stop 412 on orientation plate 407. Spring 413 normally holds the outer end of catch 405 depressed and into position to engage the upper arm of stop dog 403. Trip catch 405 is adapted to be released by a bell crank 414 pivotally mounted on bracket 415 (Figure 20) secured to plate 409, the rounded end of bell crank 414 engaging the adjacent end of latch 405, at a point in axial alignment with shaft 321 and pivot stud 408. By this construction it is clear that the orientation plate 407 may be adjusted about its pivot stud 408 without interfering with the operative association of the latches 403, 405, and 414. This adjustment of the orientation plate 407 serves to adjustably position the end 402 of stop arm 403 for a purpose well known in the art.

In order to release the bell crank 414, a plunger 416 is positioned to engage one end thereof, (Figures 20 and 21), said plunger being supported from bracket 415 mounted on plate 409. The outer end of plunger 416 is adapted to be engaged by an adjustable eccentric head 417 of a stud 418 on the upper short arm 419 of armature lever 329. Head 417 is eccentrically mounted in order that its position may be readily adjusted.

Starting of the distributor of this embodiment of the invention is accomplished in a manner similar to that of Figure 1; that is, trip bail 118 journalled on shaft 117 is adapted to operate trip arm 122, this movement taking place when trip cam 325' engages arm 421 of bail 118 (Figure 20).

The operation of this embodiment of the invention is as follows. Normally the repeating selector is in the stop position as shown. In this position selecting magnet 327 is energized and armature 328 is held upwardly against tension of spring 334. In this position, armature extension 419 has been moved counter-clockwise about pivot studs 330 by the armature spring 334 to the position shown in Figure 20. In this position, spring 413 acting upon latch 405 moves said latch counter-clockwise (Figure 20) moving the bell crank 414 clockwise, and positioning the end of latch arm 405 into the path of movement of stop dog 403 to prevent movement thereof. The driving motor suitably connected to shaft 321, is rotating at this time but the friction clutch including plates 394, 395 and 396 slips due to the fact that arm 401 on the cam drum 320 is latched stationary by portion 402 of the stop dog 403, (see Figure 21).

Referring to Figure 22, it will be noted that the start segment 112 of the repeater B is "dead" and a similar "dead" start segment is provided on the transmitter connected to the line. Therefore, when the transmitter initiates transmission of a code permutation of signals its brush arm engages the "dead" start segment to de-energize magnet 327 of the repeater. Spring 334 then retracts magnet armature 328 and armature extension 419 carries eccentric 417 clockwise as viewed in Figure 21, pressing plunger rod 416 inwardly and rotating bell crank 414 counter-clockwise and correspondingly moving latch arm 405 clockwise. This movement of latch arm 405 carries its end out of the path of stop dog 403. Due to the constant pressure of arm 401 fixed to the cam drum 320 against latch 402, stop dog 403 is at once moved counter-clockwise (Figure 21) about its pivot stud 404 sufficient to allow arm 401 to clear the latch 402. Cam drum 320 is thus released for one complete rotation.

Next the first intelligence impulse from the first intelligence segment 109 of the transmitter is received to selectively position the armature of magnet 328. Assuming that this impulse is of a marking nature, armature 328 is attracted, moving armature extension 329 counterclockwise. In the meantime the trip cam 325' has engaged arm 421 to rotate the trip bail 118, releasing distributor arm 107 of the repeater which starts rotating due to the friction clutch associated therewith. This arm engages "dead" start segment 112 to initiate operation of any other repeaters in the line or the receiver connected thereto if no other repeaters are used.

Next, locking arm 347 is moved counter-clockwise about its pivot 318 against tension of its spring 349, due to tooth 348 riding up on the first shoulder 351 on cam 350 of the cam drum. Movement of locking lever 347 carries its knife edge 352 into engagement with similar knife edge 353 of armature extension 329 to latch the same in set position. Thus the armature is locked in position long enough to allow the transfer to take place from the armature to the contacts, and in this way if the signal is distorted when it acts to energize magnet 327 and its active portion is so weak that it would not hold armature 328 long enough to effect the transfer, then the locking lever 347 will hold the armature in selected position even if the signal is too weak to do so. This action is known as "point selection", that is, the most effective point of a signal if of sufficient strength to operate the armature can be prolonged mechanically for sufficient time to allow the mechanical operation to take place. This locking action occurs for each of the five selections, locking lever 347 dis-engaging the armature extension 329 by dropping off of the high portions of teeth 351 of cam 350. Thus armature extension 329 is released for each successive setting.

While the armature extension is latched as above described, the first selector cam 325 on cam drum 320 engages the follower nose of the first bell crank 317 for the first selector lever 312. This movement causes the first bell crank 317 to move counter-clockwise (Figure 19) carrying its selector lever 312 upwardly to engage end 339 thereof with one projection 338 of the armature extension. According to whether the impulse was of a marking or spacing nature, this first selector lever 312 is rocked either to its right or left hand position. When bell crank 317 rides down off the high portion of its cam 325 it moves selector lever 312 downwardly to selectively rock its T-lever 340 about its pivot 342. If the initial impulse was of a marking nature, as was assumed, selector lever 312 will be moved to its left hand position and will rotate its T-lever 340 counter-clockwise, carrying contact controlling slide 341 downwardly, Figure 18, to cause engagement of contacts 365 and 366 carried on the contact springs.

Each selector lever 312 is positioned in right or left hand position in accordance with whether the magnet 327 has assumed a marking or spacing position and thus the five pairs of contacts 365 and 366 are selectively positioned. The armature extension 329 is locked in position by locking bell crank 317 just prior to engagement of ends 339 of the selector levers with extensions 338 of the armature extension.

Distributor 110 of the repeater will have continued its rotation to transmit over the line intelligence signals as thus impressed on segments 109 of the repeater distributor. The last signal of a group of code signals is always a stop signal of marking nature, and magnet 327 of the repeater is therefore energized. Upward movement of armature 328 withdraws eccentric 417 from engagement with plunger 416 and allows spring 413 to position the end of latch arm 405 in the path of locking dog 403, whereby this dog may not move. Therefore, dog 403 becomes rigid and when arm 401 of the cam barrel engages latch 402, rotation of the cam barrel ceases. This returns the parts to the initial position, the repeater having thus re-transmitted one complete group of code signals. In this stop position, distributor brush 107 engages stop segment 113 which is connected directly to the battery, thus sending a stop impulse over the line.

As previously stated, the repeater of this form and of the prior forms of this invention may be connected in a line wherein several repeaters are used. Due to the fact that each repeater regenerates and re-transmits signals of full strength, the signals received at the recorder C shown in Figure 22 or recorder D of Fig. 17, are of substantially full strength and will accurately operate the recorder. The recorders may be of any well known type controlled by a selector magnet for single current working, such for example, as the recorder described in Letters Patent #1,567,392 granted December 29, 1925 to E. Kleinschmidt.

The novel speed control and start-stop operation of a plurality of repeaters as hereinbefore described forms an important feature of this invention. In some systems when a number of regenerative repeaters are operated on the same circuit they are operated in synchronism. It has been found in systems of this kind that when the synchronism of one of the repeaters is slightly disturbed the synchronism of a second repeater whose speed is controlled from the first repeater is subject to a greater disturbance. In fact, in some cases the operation has proven entirely impracticable for this reason. This is especially true when identical pieces of apparatus are used at different stations since they will then have substantially identical periods of oscillation when disturbed so that there is likely to be a regenerative action which greatly magnifies the original disturbances. In the system here proposed each repeater is adjusted to a certain standard of speed within certain allowed limits in exactly the same manner as two terminal instruments are adjusted in an ordinary start-stop system without repeaters. For example, if 1650 R. P. M. is adopted as the standard speed of the motor, all the motors are adjusted to 1650 ± 8. The stop interval of each repeater then must compensate only for the difference of speed between itself and the transmitter which controls it. This result is made possible by stopping the retransmitting distributor at the end of each signal and in starting it at the beginning of each signal so that the variations of speed between the different repeaters in the circuit are compensated for in exactly the same manner as the stopping of the receiving distributor compensates for the difference in speed between the sending and receiving instruments. In this system the compensation results in slight variations in the length of the stop impulse in regenerated signals but the start impulse and the code impulses are precisely the same as though they were being generated by continuously running distributors driven by a motor running at the same speed as the motor driving the repeater.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. In a telegraph system, a first and a second telegraph circuit, means to transmit permutation code signals over said first circuit, means to receive and store the elements of said signals in sequence, embodying a single magnet, a series of contacts, and solely mechanical means controlled by said magnet to set said contacts sequentially in groups in accordance with the received code signals, and means controlled by said contacts to retransmit said permutation code signals over said second circuit.

2. In a telegraph system, a first telegraph circuit, a second telegraph circuit, means to transmit code signals over said first circuit, a repeater located between said circuits; said repeater including a receiving distributor controlled by a single magnet to receive and store said signals for an appropriate period of time, and means to subsequently transmit the stored signals over the second circuit.

3. A telegraph repeater comprising a single receiving magnet, a longitudinally movable cam drum, contact closing members, means whereby said receiving magnet controls the successive longitudinal positions of said cam drum, and cam mechanism carried by said cam drum whereby the said contact closing members are made responsive to said cam drum positions.

4. A regenerative telegraph repeater comprising a constantly rotating member driven by a local source of motion, a cam drum, a single receiving magnet, a series of selecting members, a series of contacts, a clutch adapted to connect said constantly rotated part to said cam drum whereby said cam drum is moved to various selective positions under the control of said magnet, the various positions of said cam drum acting to control said selecting members to operate said series of contacts to store signals received on said selector magnet for a predetermined period of time, a segmental distributor, local signalling current sources adapted to be connected to said distributor through said contacts, and a second clutch member under the control of said cam drum, whereby said segmental distributor becomes operative from said constantly driven part to retransmit said stored signals with substantially their original accuracy.

5. A regenerative telegraph repeater comprising a constantly rotating part, a cam drum, a single receiving magnet responsive to received impulses, a series of selecting members, a clutch, and means whereby said clutch connects said cam drum to said constantly rotating part, said cam drum having cam mechanism coacting with said receiving magnet to set said selecting members in positions determined by received code combinations of impulses, a second clutch member, and transfer means under the control of said cam drum to transfer one fixed group of a code combination of received impulses according to the setting of said selecting members to a corresponding fixed group of contacts, said transfer means also becoming effective to transfer the remaining fixed group of received impulses according to the selected positions of said selecting members to the remaining correspondingly fixed group of contacts, a retransmitting distributor, means under the control of said transfer means to initiate rotation of said retransmitting distributor, local signalling current sources, and means whereby said local current sources become effective in conjunction with the above mentioned two groups of contacts and said retransmitting distributor to repeat the received impulses with substantially their original accurary.

6. A regenerative telegraph repeater comprising a start-stop receiving distributor, a retransmitting distributor, a set of selectors having contacts associated therewith, a local source of line current, driving means for operating said distributors and said selectors, and a single sensitive magnet for initiating operation of said receiving distributor and for selectively positioning said selectors to connect said local source of line current to said retransmitting distributor whereby received signals are retransmitted with substantially their original accuracy.

7. A telegraph repeater for regenerating and retransmitting received signals with substantially their original accuracy comprising a start-stop receiving distributor, a retransmitting distributor, driving means for said distributors, and a single sensitive magnet operative upon reception of a start condition on the line to initiate operation of said receiving distributor by said driving means and operative thereafter to selectively energize the retransmitting distributor to retransmit received signals, said driving means performing all mechanical work of the repeater, whereby said magnet may be light in weight and sensitive to weak line signals.

8. A telegraph repeater for regenerating and retransmitting received signals with substantially their original accuracy comprising a receiving distributor, a retransmitting distributor, contact mechanism, a single selector magnet, and solely mechanical means operative under control of said selector magnet to selectively operate said contact mechanism in accordance with received signals for retransmitting said signals by said retransmitting distributor.

9. The invention as defined in claim 8 wherein both said distributors are operated solely by mechanical means, whereby said selector magnet may be light in weight and extremely sensitive.

10. A telegraph repeater for regenerating and retransmitting received signals with substantially their original accuracy comprising a single selector magnet, a receiving distributor, a retransmitting distributor, storage selector mechanism, contact mechanism operatively associated with said selector mechanism and said retransmitting distributor, and solely mechanical means operative under control of said selector magnet to operate the moving parts of the repeater whereby said selector magnet may be extremely sensitive.

11. A telegraph repeater for regenerating and retransmitting received signals with substantially their original accuracy comprising a receiving distributor, a retransmitting distributor, a source of line current, a single selector magnet, means operative under control of said selector magnet for selectively connecting said source of line current with said retransmitting distributor, and solely mechanical means for operating the driven parts of said repeater.

12. In a telegraph system, two telegraph circuits, regenerative repeating apparatus intermediate said circuits including a selector element, means responsive to signals impressed on one of said circuits for setting said selector element, members successively actuated by said selector element, a plurality of contacts, and means operated following the actuation of said members for operating said contacts in accordance with the position of said members to transmit signals to the other circuit.

13. In a telegraph system, two telegraph circuits, regenerative repeating apparatus intermediate said circuits including a selector element, means responsive to signals impressed on one of said circuits for setting said selector element, members successively actuated by said selector element, a plurality of contacts, means operated following the actuation of said members for operating said contacts in accordance with the position of said members to transmit signals to the other circuits, and means for retaining said members in their actuated positions until a change in the signal occurs.

14. In a telegraph system, two telegraph circuits regenerative repeating apparatus intermediate said circuits including a selector element, means responsive to the signals impressed on one of said circuits for setting said selector element, members successively actuated by said selector element, a plurality of contacts, and means for actuating all of said contacts simultaneously in accordance with the position of said members to determine the transmission of signals on the other circuit.

In testimony whereof I affix my signature.

EDWARD E. KLEINSCHMIDT.